US009292717B2

(12) United States Patent
Moran et al.

(10) Patent No.: US 9,292,717 B2
(45) Date of Patent: Mar. 22, 2016

(54) APPARATUS FOR FORMING AND READING AN IDENTIFICATION FEATURE AND METHOD THEREOF

(76) Inventors: Peter Malcolm Moran, Massagno (CH); Narayan Numbudiri, Singapore (SG); Winston Cheng Lock Tan, Singapore (SG); Satya Prakash Sharma, Setauket, NY (US); Adrian Paul Burden, Malvern Worcestershire (GB)

(*) Notice: Subject to any disclaimer, the term of this patent is extended or adjusted under 35 U.S.C. 154(b) by 0 days.

(21) Appl. No.: 13/995,123

(22) PCT Filed: Dec. 16, 2011

(86) PCT No.: PCT/SG2011/000438
§ 371 (c)(1),
(2), (4) Date: Oct. 4, 2013

(87) PCT Pub. No.: WO2012/082075
PCT Pub. Date: Jun. 21, 2012

(65) Prior Publication Data
US 2014/0014715 A1    Jan. 16, 2014

Related U.S. Application Data

(60) Provisional application No. 61/423,629, filed on Dec. 16, 2010.

(51) Int. Cl.
G06F 17/00 (2006.01)
G06K 5/00 (2006.01)
G06K 19/06 (2006.01)
G06K 7/01 (2006.01)

(52) U.S. Cl.
CPC .. G06K 5/00 (2013.01); G06K 7/01 (2013.01); G06K 19/06084 (2013.01); G06K 19/06196 (2013.01)

(58) Field of Classification Search
CPC .......... G06F 7/1025; G06K 1/00; G06K 5/00; G06K 5/02
USPC ................ 235/375, 380, 385, 462.01, 462.46
See application file for complete search history.

(56) References Cited

U.S. PATENT DOCUMENTS

| 4,663,622 | A |   | 5/1987  | Goldman |
|-----------|---|---|---------|---------|
| 5,444,223 | A | * | 8/1995  | Blama ............................ 235/435 |
| 7,207,481 | B2 | * | 4/2007  | Barenburg et al. ............ 235/381 |
| 7,891,567 | B2 | * | 2/2011  | Burden et al. ................. 235/449 |
| 2004/0268130 | A1 |   | 12/2004 | Pretorius |
| 2005/0058483 | A1 |   | 3/2005  | Chapman et al. |
| 2008/0210757 | A1 |   | 9/2008  | Burden et al. |

OTHER PUBLICATIONS

International Search Report of PCT/SG2011-000438, mailed Mar. 29, 2012, 5 pages.

* cited by examiner

Primary Examiner — Daniel St Cyr
(74) Attorney, Agent, or Firm — Pillsbury Winthrop Shaw Pittman LLP

(57) ABSTRACT

The present invention refers to an apparatus for forming and reading an identification feature on or in an object. The apparatus comprises a formation unit for physically forming an identification feature on or in an object, at least one reading unit adapted to read the identification feature to form a signature, and a housing, wherein the formation unit and the at least one reading unit are both contained in the housing. The at least one reading unit can comprise at least two reading elements. The identification feature can comprise an identification feature based on inherent disorder. The invention also refers to a method of forming and reading an identification feature on or in an object.

20 Claims, 3 Drawing Sheets

US 9,292,717 B2

APPARATUS FOR FORMING AND READING AN IDENTIFICATION FEATURE AND METHOD THEREOF

CROSS-REFERENCE TO RELATED APPLICATIONS

This application is a national stage of International Patent Application No. PCT/SG2011/000438 filed on Dec. 16, 2011, which claims priority to U.S. Provisional Application No. 61/423,629 filed Dec. 16, 2010, the contents of which are incorporated herein in their entireties.

FIELD OF THE INVENTION

The present invention refers to the field of anti-counterfeiting and authentication technology. In particular, it refers to an apparatus for forming and reading an identification feature on or in an object. The invention also refers to a method of forming and reading an identification feature on or in an object.

BACKGROUND

Identification technology has been an area of widespread interest and development for many years. One of the main reasons for the continued interest in identification technology is the incidence of fraud largely attributable to transactions which have been carried out in a non-secure manner. The need for more secure systems of transactions is apparent.

Common methods of identification rely on the use of readable tags. Such tags utilize identification features such as serial numbers, holograms, barcodes, magnetic stripes and Radio Frequency Identification (RFID) for purposes of identification. A manufacturer of goods or articles of commercial value can purchase these tags and apply them to the products before selling and distributing the items.

Besides the above-mentioned identification features, "inherent disorder" based identification features have also been used either alone or in combination with other identification features to uniquely identify objects and to provide evidence of the authenticity of objects for anti-counterfeiting purposes. An "inherent disorder" based feature is a feature based on a disordered material, wherein the structure of the disorder is used to identify the object. Due to the "randomness" of the disorder, it is extremely difficult, if not, impossible to replicate the features of the disordered material. As such, a unique fingerprint or signature can be obtained using the disordered material. The disordered material may be a part of the object itself, or may be part of a tag that is affixed to the object. Further, the disordered material may be a coating, composite or structure.

There are numerous previously known examples of the use of inherent disorder for identification and authentication purposes. For example, Ingenia Technology Limited, of London, UK, has described a system that uses the inherent disorder of fibers within paper, mapped using laser-speckle interferometry, to identify the paper. A more complete description of this technology can be found in PCT application WO 2006/016114.

Another previously known use of inherent disorder is shown in U.S. Pat. No. 7,380,128, assigned to Novatec, SA, of Montauben, France. This patent shows use of random bubbles within a transparent polymer for identification and authentication. Optical methods are used to read the three-dimensional layout of the bubbles within the polymer. This information can be used to provide a unique signature for a "bubble tag".

Other inherent disorder-based identification and authentication technologies include use of randomly distributed quantum dots or nanobarcodes, use of ink containing magnetic particles arranged in a disordered pattern, use of random "jitter" in the magnetic stripes of credit cards, and use of random distribution of taggant particles that are invisible to human vision on an article (see PCT application WO 2005/104008).

Additional inherent disorder-based tags that use a combination of magnetic and/or magnetisable and/or conductive and/or semi-conductive and/or optically active particles and/or optically distinguishable particles have been reported by the present applicant, Bilcare Technologies. These technologies are further detailed in PCT applications WO 2005/008294, WO 2006/078220 or the commonly owned PCT applications WO 2007/133164, WO 2007/133163, and WO 2009/105040, for example.

Various signal detection systems, usually based on optical, magnetic and magneto-optical effects, are used to read these inherent disorder features. Once read, information on the inherent disorder features corresponding to the "fingerprint" or signature of the object can be processed either in the reading unit itself or in a back-end computer system to use the information for identification and/or authentication purposes.

In the field of anti-counterfeiting and authentication technology, it is advantageous to use combinations of technologies for enhanced protection. For example, inherent disorder features may be used in combination with other identification or authentication features, such as barcodes, magnetic strips, RFID, optical characters, or even logos of the manufacturer. Depending on the application area, such as the type of goods and desired security level, different anti-counterfeiting and authentication technologies can be combined in different ways to suit the needs of individuals.

It is therefore advantageous for the manufacturer of an item of value to be able to form and read an identification feature on or in an object, which can be customized easily according to the requirements of the end user.

SUMMARY OF THE INVENTION

In a first aspect, the present invention refers to an apparatus for forming and reading an identification feature on or in an object. The apparatus comprises a formation unit for physically forming an identification feature on or in an object, and at least one reading unit adapted to read the identification feature to form a signature. The apparatus further comprises a housing for containing both the formation unit and the at least one reading unit.

In a second aspect, the present invention refers to an apparatus for forming and reading an identification feature on or in an object. The apparatus comprises a formation unit for physically forming an identification feature on or in an object, and at least one reading unit adapted to read the identification feature to form a signature. The at least one reading unit comprises at least two reading elements.

In a third aspect, the present invention refers to an apparatus for forming and reading an identification feature on or in an object. The apparatus comprises a formation unit for physically forming an identification feature on or in an object, wherein the identification feature is radio frequency. The apparatus comprises at least one reading unit adapted to read the identification feature to form a signature. The apparatus further comprises a housing for containing both the formation unit and the at least one reading unit.

In a fourth aspect, the present invention refers to a method of forming and reading an identification feature on or in an object. The method comprises providing an apparatus comprising a formation unit for physically forming an identification feature on or in an object, and at least one reading unit, wherein the at least one reading unit is adapted to read the identification feature on or in the object to form a signature, wherein both the formation unit and the at least one reading unit are contained in a housing.

In a fifth aspect, the present invention refers to a method of forming and reading an identification feature on or in an object. The method comprises providing an apparatus comprising a formation unit for physically forming an identification feature on or in an object, and at least one reading unit, wherein the at least one reading unit is adapted to read the identification feature on or in the object to form a signature. The at least one reading unit comprises at least two reading elements.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
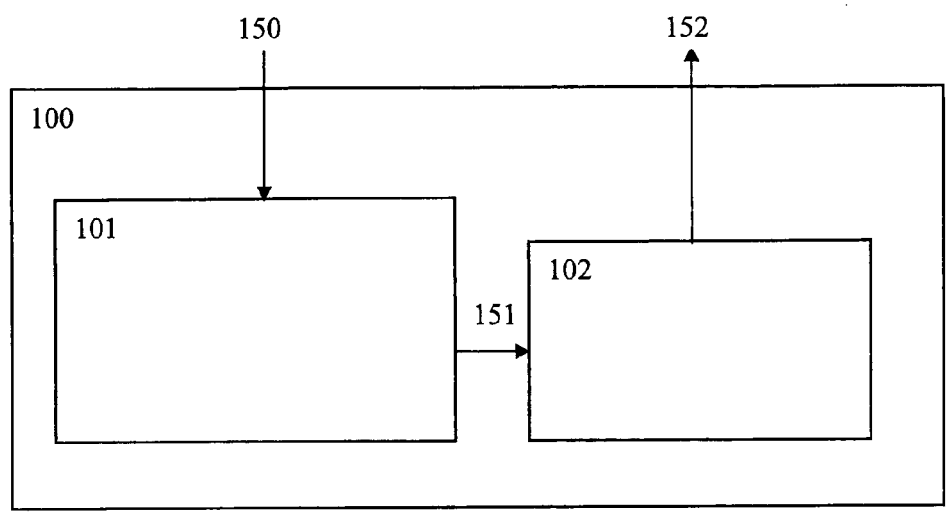
FIG. 1 shows a schematic diagram of an illustrative embodiment of an apparatus 100 for forming and reading an identification feature according to the present invention.

The present invention refers to an apparatus for forming and reading an identification feature on or in an object. The apparatus comprises a formation unit for physically forming an identification feature on or in an object, and at least one reading unit adapted to read the identification feature to form a signature. The apparatus can comprise a housing for containing both the formation unit and the at least one reading unit. The at least one reading unit can alternatively or in addition comprise at least two reading elements.

As discussed herein, it can be useful in identification, authentication and anti-counterfeiting systems for a manufacturer of an item of value to be able to form and to read an identification feature on or in an object, the object of which can be an item of value or a tag, without having to go through an external party such as an identification tag manufacturer. Besides the ability to customize the identification feature(s) to be formed on the object and/or tag, the manufacturer has greater operational flexibility to decide on the type and/or combination of identification features as well as to set the desired security level depending on the type of goods, without having to coordinate with the identification tag manufacturer. In addition, the present invention provides an apparatus for forming and reading of identification information that may be small, compact and portable (like an conventional inkjet or laser printer) so that a producer or provider of an item of value can use an apparatus of the invention "on site". Furthermore, for items of value, be they luxury goods (such as watches, jewelry, hand bags or sun-glasses, for example) or identification documents such as identification cards, membership passes, or credit cards or ATM cards that necessitate high security levels, by forming and reading the identification feature in-house, information regarding identification feature, such as the number of identification features, their types, combination of the features and location, can be kept as confidential information by the manufacturer of the item of value, thereby increasing further the level of security on the product.

Accordingly, the present invention provides an apparatus for forming and reading an identification feature on or in an object. The term "identification feature" as used herein refers to any feature which demonstrates one or more physical characteristic or property, the characteristic or property of which can be consistently measured. For example, a two dimensional (2-D) barcode is an identification feature as its reflectivity can be consistently measured using a barcode reader. Besides reflectivity, other examples of physical characteristic or property that can be consistently measured include, but are not limited to, magnetic field strength, capacitance, conductance, fluorescence, radio frequency, luminescence, electric field strength and color.

The identification feature can have a regular pattern, for example, an optically readable pattern such as a series of dots, line patterns, a graphic, a symbol, a product logo, a simple timing mark(s), one-dimensional (1-D), two-dimensional (2-D) or three-dimensional (3-D) barcodes, and holographic features, or an ordered arrangement, such as an organized array of magnetic particles or quantum dots. Identification information comprised in the patterns may be pre-determined i.e. the value of the identification information contained in the pattern is known, and the identification feature is generated to reflect this value.

The identification feature may alternatively or in addition also have an irregular pattern. For example, the identification feature can be an identification feature based on inherent disorder, such as a pattern formed by a disordered material. The identification information comprised in an identification feature based on inherent disorder is not known prior to formation of the feature. Instead, the identification information is generated only during or after the identification feature is formed. Due to the "randomness" of the disorder, it is extremely difficult, if not, impossible to replicate the identification feature based on inherent disorder. As such, a unique fingerprint or signature can be obtained. Note that herein the term "random" is used to indicate that the features are highly disordered and their exact structure is not controlled; so their structure can be considered to be "random" but this does not necessarily imply that all possible structures occur with the exact same probability, i.e. they may not strictly follow the mathematical definition of a random distribution.

Examples of identification features based on inherent disorder include, but not limited to, a disordered arrangement of particles, for example, particles in the micrometer or in the nanometer range (the latter particles are also known as nanoparticles). The particles may have any suitable and available particles size as long as the particle size is able to provide a measurable signal and as long as the particle size is, for example, compatible with the methodology chosen for the formation of the particles being arranged in a disordered manner, for example, in a matrix, for forming the identification feature. The average particle may have a largest dimension of, for example, between about 10 nanometers to about 500 micrometers, such as about 10 nanometers to about 300 micrometers, or about 50 nanometers to about 200 micrometers. The identification feature may be a disordered arrangement of magnetic and/or magnetisable particles, a disordered arrangement of optically active particles and/or optically distinguishable particles, a disordered arrangement of conductive and/or semi-conductive particles, or a mixture of such particles. Further examples of suitable disordered materials or particles include, but are not limited to, the porous materials filled with magnetic or electrically conducting material described in US patent application 2005/017082, the international patent application WO 2005/008284, or the particles described in PCT applications WO 2006/078220, WO 2007/133163 and or WO 2007/133164 the entire contents of which are incorporated herein by reference.

In some embodiments, a disordered arrangement of nanoparticles may be used as one identification feature. As used herein, the term "nanoparticle" refers to a particle having dimensions in the nanometer range, i.e. having at least one region or characteristic dimension with a dimension of less than about 500 nm, such as less than about 200 nm or less than about 100 nm.

Examples of suitable nanoparticles include quantum dots and nanobarcodes. Quantum dots are semiconductor nanocrystals that confine the motion of conduction band electrons, valence band holes, or excitons (in all three spatial directions), and can serve as "droplets" of electric charge. Quantum dots can be as small as 2 to 10 nanometers, with self-assembled quantum dots typically ranging between 10 and 50 nanometers in size. Nanobarcodes, such as that described in described in U.S. Pat. No. 7,225,082, can also be used as the identification feature. Each nanobarcode can comprise two or more different materials alternated along its length. The alternation of the two or more different materials can take place in a disorderly manner to form the identification feature. Besides the use of different materials, surface of the nanobarcodes can be functionalized with different chemical groups so as to confer different properties to the materials. Typically, a nanobarcode has widths of between 30 nm to 300 nm. The term "nanoparticle" also includes nanostructures such as nanorods, nanowires (also called nanofibers), nanotubes, nanoflakes and nanoflowers. The disordered arrangement of nanoparticles can be used to form an identification feature on or in an object and a unique fingerprint or signature can be derived for the object. Other disordered arrangement of particles which have dimensions, for example, in the micrometer range, can however also be used in the present invention.

Accordingly, any material exhibiting magnetic properties can be used to form the identification feature, as long as this material can be provided in a particulate form, for example, to form a disordered arrangement of particles. This includes magnetic materials such as ferrimagnetic materials, antiferromagnetic materials and ferromagnetic materials. Magnetic materials used include but are not limited to ferromagnetic materials such as Fe, Ni, Co, Gd, Dy, the corresponding alloys, oxides and mixtures thereof, and other compounds such as MnBi, CrTe, EuO, $CrO_2$ and MnAs. Other materials influenced by magnetism are also contemplated. Examples of such materials include ferrimagnetic materials e.g. spinels, garnets and ferrites such as magnetite. Other materials commonly used in magnetic media, such as alloys of Ce, Cr, Pt, B, Nd (e.g. Nd—Fe—B, Nd—Fe—Co—B, Nd—Pr—Fe—Co—Ti—Zr—B), Sm (e.g. $SmCo_5$), and alloys such as, AlNiCo, Permalloy and MuMetal are also contemplated. The identification feature can, however, also be formed by domains of varying magnetic properties within a continuous material including voids in the material that cause variable magnetic properties. Such domains of varying magnetic properties are thus encompassed in the term 'magnetic or magnetizable particles'. The magnetic material can also be used in order for magneto-optical reading of the magnetic particles (that form the identification feature) as described in International Patent Application WO 2009/105040.

In addition or alternatively, also any optically active particle can be used in the present invention to form the identification feature. By 'optically active' in the present application, it is meant particles that change the wavelength and/or plane of polarisation of light that is transmitted through or reflected from them. According to this embodiment, an optical detector can be used as a reading element to read the identification feature. The identification feature may be formed from, for instance, particles that fluoresce at a specific wavelength, chiral particles that change the plane of polarisation, or a mixture of particles that fluoresce at different wavelengths and/or change the plane of polarisation of interacted light, to name only a few. Examples of optically active particles include, but are not limited to, dye particles, dye coated particles, phosphorescent particles, quantum dot particles, photoluminescent particles, polarizing crystals, chiral molecules, liquid crystals, birefringent particles and mixtures thereof.

Optically distinguishable particles can also be used in the present application to form the identification feature. The term "optically distinguishable" means particles that can be differentiated from one another and/or from the background under electromagnetic radiation. Examples of optically distinguishable particles include, but are not limited to, metal particles, ceramic particles, polymeric particles, and domains of varying optical properties within a continuous material and mixtures thereof.

In some embodiments, conductive particles and/or semi-conductive particles can also be used to form an identification feature. Also in the case of conductive or semi-conductive particles, the identification feature can also be formed by domains of varying conductive properties within a continuous material including voids in the material that cause variable conductive properties. Such domains of varying magnetic properties are thus encompassed in the term "conductive or semi-conductive particles". Examples of conductive particles include, but are not limited to metal particles such as particles formed from metal particles such as Cu, Sn, Fe, Ni or alloys thereof, carbon black particles, graphite particles, metal coated particles, and domains of varying conductive properties within a continuous material, and mixtures thereof. Examples of semi-conductive materials which can be used to form semi-conductive particles include (poly)silicon, gallium arsenide, gallium nitride, platinum silicide, silicon nitride or sichrome (SiCr), to name only a few.

One or more characteristics or properties can be read from the identification feature to form a signature. For example, some magnetic particles such as those formed from iron can exhibit conductive properties as well. Therefore, both its magnetic properties, such as magnetic field strength, and conductive properties, such as electric field strength, can be measured. As another example, in the case of magnetic quantum dots, which are quantum dots exhibiting magnetic properties, both the fluorescence and magnetic field strength of the disordered magnetic quantum dots can be measured. By measuring two or more characteristics or properties from a single set of identification feature, a person attempting to replicate the identification feature exhibiting the same two or more characteristics can find it extremely difficult, if not impossible, to do so. Therefore, measuring two or more characteristics from an identification feature can provide enhanced security due to the increased complexity of signature formed.

The invention can also include a combination of identification features, for example magnetic and/or magnetisable particles, conductive and/or semi-conductive particles, optically active and/or optically distinguishable particles, can be combined to further improve the reliability and the security of the system. For example, an ink medium comprising magnetic particles and conductive particles dispersed therein can be used for printing a logo on the surface of an object. The first identification feature can then be formed from the disordered arrangement of magnetic particles, and the second identification feature can be formed from the disordered arrangement of conductive particles. In such an embodiment, a combination of an optical verification and a magnetic verification can be implemented. In another example, a barcode is formed as a first identification feature and a hologram formed as a second identification feature, with these two identification features being separately formed on the surface of an object. In such an embodiment, a barcode verification and a hologram verification can be implemented. In a further example, a first identification feature comprising a radio frequency identification tag and a second identification feature comprising a disordered arrangement of magnetic particles can be formed separately on the surface of an object. In such embodiment, a combination of an radio frequency verification and a magnetic verification can be implemented. In this context, it is noted that the average particle that may have a significant effect on the fingerprint/derived signature can have a largest dimension of between about 10 nanometers to about 500 micrometers, such as about 10 nanometers to about 300 micrometers, or about 50 nanometers to about 200 micrometers.

Besides the above-mentioned examples of particles that can be used in the present invention, yet other examples of suitable disordered materials include, but are not limited to voids, fibers, bubbles, domains and variations within a continuous material, for example roughness and colour variations. Examples of voids include air pockets formed in an injection molded article, or cavities on a material after a dissolution process. Examples of fibers include, but are not limited to, fibers found in a sheet of paper, or disordered fibers such as wood fibers, cellulose fibers, mineral fibers or polymer fibers dispersed in a suitable matrix. An example of bubbles that can be used is described in US patent application 20030014647. Other examples include continuous light pipes with two ends arranged on one or more edges of a layer such as described in PCT application WO 87/00604 or the U.S. Pat. No. 4,682,794.

Depending on the type of identification feature to be formed on or in an object, the apparatus for forming and reading an identification feature on or in an object according to the present invention can comprise different formation units. A formation unit refers to a mechanism for physically forming or generating an identification feature. For example, when the identification feature is a regular pattern such as a series of dots or a barcode, the formation unit can comprise a printing element operable to apply an ink medium on or in an object so as to form the identification feature. The printing element can be a printer that is commonly available in the market, such as a laser printer, an ink jet printer or a thermal ribbon printer.

When the identification feature is an identification feature based on inherent disorder, for example, a material containing disordered material or particles, the formation unit can be a printing element adapted to print an ink medium, the ink medium of which comprises the identification feature based on inherent disorder such as a disordered material. As mentioned herein, the disordered material can comprise a disordered arrangement of nanoparticles, disordered fibres, a disordered arrangement of magnetic and/or magnetisable particles, a disordered arrangement of optically active particles and/or optically distinguishable particles, and a disordered arrangement of conductive and/or semi-conductive particles, or a mixture thereof.

The type of printing element that is used can depend on the type or nature of ink medium that the identification feature based on inherent disorder is dispersed in. For example, the identification feature based on inherent disorder can be dispersed in a solid composition. The identification feature based on inherent disorder can be a disordered material such as disordered nanoparticles. The disordered nanoparticles can be dispersed in a solid composition such as a toner or a solid ink. In these embodiments, a suitable printing element can be a laser printer (head) or a solid ink printer (head).

Any type of laser printer (head) can be used in the present invention. Typically, a laser printer uses an optical lens system to focus the light beam output of a laser to a spot on a photosensitive surface, such as a photoconductor drum or a primary charge roller. The spot is caused to sweep across the surface in a raster fashion by a rotating or oscillating mirror. Computer or video raster information modulates the light beam as the photosensitive surface moves in a direction perpendicular to and under the sweeping light beam. The sweeping and modulated light beam causes the formation of an electrostatic charge image on the photosensitive surface. This image can then be developed using a solid composition comprising a toner, which can include fine particles of dry plastic powder mixed with carbon black or coloring material, and the identification feature based on inherent disorder such as disordered magnetic particles. The toner particles can be melted by the heat of a fuser assembly and can bind to the surface of an object in a manner typical of electrophotographic copiers.

In some embodiments, the disordered material or particles are at least partially melted by the heat of the fuser assembly. The disordered material or particles are fused together with the toner particles to form the printed mark or image. Due to differences in property, such as reflectivity of printed mark or image formed using the disordered material or particles and the toner particles, a fingerprint or signature for identifying the object can be formed. In other embodiments, the disordered material or particles are not melted by the heat of the fuser assembly. The disordered material or particles can bind to the object along with the fused toner particles to form the printed image or mark. The printed image or mark comprising the disordered material or particles thereby forms an identification feature for identifying the object.

A solid ink printer (element) or print head can also be used as the printing element of the present invention. Typically, the solid ink printer has an ink loader which receives and stages solid ink sticks which can remain in solid form at room temperatures. The solid ink sticks can comprise an ink medium such as carbon black or a coloring material, and an identification feature based on inherent disorder such as disordered material or particles dispersed therein. Solid ink sticks of different color can be loaded and fed in independent channels of the ink loader. An ink melt unit can melt the ink by raising the temperature of the ink sufficiently above its melting point. During a melting phase of operation, the leading end of an ink stick can contact a melt plate or heated surface of the melt unit, and the ink medium can be melted in that region. In some embodiments, the disordered material or particles are not melted and remain in particulate form. The liquefied ink can be supplied to a single or group of print heads by gravity, pump action, or both. In accordance with the image to be reproduced, and under the control of a printer controller, a rotating print drum can receive ink droplets representing the image pixels to be transferred to the surface of an object, such as paper or other media, from a sheet feeder. To facilitate the image transfer process, a pressure roller can press the object against the print drum, whereby the ink along with the disordered material is transferred from the print drum to the object. The temperature of the ink can be carefully regulated so that the ink fully solidifies just after the image transfer.

Besides the above-mentioned printing elements, the formation unit adapting for processing a solid composition comprising disordered material or particles can alternatively comprise an adhesive application element adapted to apply an adhesive on or in an object, and a spraying element adapted to disperse the solid composition on the adhesive. The adhesive application element can be in the form of a sprayer, a spin coater, a printer, a brush or any device that is adapted apply an adhesive on or in an object. Examples of adhesive include, but are not limited to, contact adhesives, thermoplastic adhesives, and curable adhesives. The adhesive can be formed as a layer on the surface of the object. The spraying element can disperse the solid composition comprising the disordered material or particles on the adhesive in a disordered manner, using for example, a gas stream to carry the solid composition, or a mechanical screen to sieve and disperse the solid composition on the adhesive.

A spraying element may however not be required but the solid composition comprising the disordered material or particles can also be dispersed on the adhesive using gravity only. In some embodiments, a curing element is comprised in the formation unit to cure the adhesive such that the disordered material or particles are held in place in the adhesive. The curing element can be a curing element that hardens the adhesive using electromagnetic radiation such as infrared, ultraviolet, or visible light, or heat. The disordered material or particles can be embedded in the adhesive thereby forming an identification feature on the object. In some embodiments, a particle collection element that is adapted to remove unbound solid particles is comprised in the formation unit. For example, the particle collection element can operate via vacuum to collect the particles into a dust bag, where the particles can be reused or disposed of. The particle collection element can alternatively be a blower, where the unbound solid particles can be directed using a gas stream to a dust bag for reuse or disposal.

The apparatus for forming and reading an identification feature on or in an object can also have a formation unit that is adapted to physically form an identification feature based on inherent disorder that is dispersed in a liquid composition. For example, the identification feature based on inherent disorder can be a disordered material such as fibers or particles. The liquid composition can comprise a polymer precursor that is curable by means of infra-red (IR), ultraviolet (UV), visible light, or heat. The liquid composition can be brought into contact with a surface of the object, for example, by printing, squeegee-ing or spraying the mixture of the liquid composition with the disordered material dispersed therein on or into the object. After solidification of the precursor, for example by curing the polymer precursor by means of infrared (IR) or ultraviolet (UV) light from a curing element, such compositions yield a mechanically stable and chemically inert matrix that ensures that the identification features are safely embedded therein.

Examples of suitable compositions include polymeric adhesives or inks. Illustrative examples of constituents of suitable adhesives or inks include conventional (dielectric) organic polymers/resins which are infrared, ultraviolet light, visible light or heat-curable such as polystyrenes, epoxy resins, polyalkylenes, polyimides, polybenzoxazoles, polyacrylates, polyether, polybenzoxayoles, polythioayoles, epoxides, (meth)acrylates, or polysiloxanes that are also described in US patent application 20040082098, for example. Other suitable compositions include those that are described in US patent applications 20050245633 and 20050245634. It is also possible that the liquid composition that contains the material or particles (that are to be deposited in a disordered manner) may consist exclusively of a meltable matrix material and material or particles that form the identification features dispersed therein. Examples of suitable meltable matrix materials of this type are thermoplastics, such as polystyrene, or inorganic matrix materials, such as metals (particularly low melting point metals and metal alloys such as solders), green ceramics, which are distinguished by their low melting point.

A liquid composition that can be used to form a disordered identification feature can also be based on an aqueous liquid, an organic liquid, a mixture of at least two organic liquids or an organic-aqueous liquid mixture. This liquid can act as a solvent, with the result that the precursor of the matrix material as well as the material or particles that form the identification features may be either dispersed or dissolved in the composition. Inorganic matrix materials such as ceramics are typically present in an ink medium in the form of a dispersion. However, they may also be dissolved in an aqueous or organic solution. One example of a dissolved inorganic matrix material is sodium (ortho)silicate, which is solidified by the addition of acid and can then be sintered in a conditioning step to discharge water. Alternatively, the material may itself contain identification features, for example a continuous material that contains domains, for example, magnetic domains or domains of varying reflectivity.

In accordance with the above disclosure, the formation unit can be a printing element adapted to print a liquid composition comprising the identification feature based on inherent disorder such as a disordered material on an object. In these embodiments, wherein the material or particles that are to form the disordered identification feature are dispersed in a liquid composition, a suitable printing element can be an impact printer such as a dot matrix printer, a plotter printer, a character printer, or a non-impact printer such as an inkjet printer, a screen and stencil printer and a thermal wax printer.

An impact printer is a printer that prints by contacting the print head(s) with the surface of the object. In some embodiments, a dot matrix printer may be used as the printing element. In a dot matrix printer, dot patterns of characters and drawings can be printed by impact printing using an ink ribbon on a printing sheet. The ink ribbon can comprise material or particles dispersed in an ink medium. A print head, consisting of an array of dot pins constituted by wires arranged in a vertical direction, is moved along a horizontal direction. While the print head is moved in a horizontal direction, the dot pins are energized and brought into contact with the printing sheet, whereby ink, together with the disordered particles, can be transferred from the ink ribbon onto the printing sheet to effect printing of dots. In some embodiments, a character printer may be used. A character printer works in the same way as a dot matrix printer, in that it is also a form of impact printer. However, in a character printer, a character is printed at any time, compared to a dot matrix printer where dots making up the characters are printed one at a time.

A plotter printer may also be used in the present invention. In a plotter printer, typically, a plurality of pens, such as ball-point pens, are provided with their front or ball-point ends directed toward and separated away from a platen on which an object such as recording paper is placed. The ink cartridge in the pen can comprise an ink medium and dispersed material or particles. By moving the pens across the surface of the object, printing is carried out. The ink medium along with the material or particles can be deposited on the surface of the object thereby forming an identification feature.

A non-impact printer refers to a type of printer that prints without having its print heads strike the surface of the object. In some embodiments, an inkjet printer is used. An inkjet printer, otherwise known as bubblejet printers, refers to a printer in which image recording on a recording medium is performed when ink in the form of small droplets is emitted from the nozzle of the recording head, using a piezoelectric element or a heater, for example, onto a recording medium such as paper or the like, and the recording head is moved over the recording medium while the ink penetrates or is fixed on the recording medium. The ink cartridge used by the inkjet printer can comprise an ink medium and particles or materials such as fibres dispersed therein. Upon printing, the ink medium along with the material or particles can be deposited on the surface of the object thereby forming an identification feature.

In screen and stencil printing, the screen may be placed on top of a surface or an object such as paper or fabric. An ink medium, comprising dispersed material or particles can be placed on top of the screen, and a fill bar (also known as a floodbar) is used to fill the mesh openings with ink. The printing begins with the fill bar at the rear of the screen and behind a reservoir of ink. The screen is then lifted to prevent contact with the substrate and then using a slight amount of downward force pulls the fill bar to the front of the screen. This effectively fills the mesh openings with ink and moves the ink reservoir to the front of the screen. A squeegee (rubber blade) is then used to move the mesh down to the substrate and pushes the squeegee to the rear of the screen. The ink that is in the mesh opening is pumped or squeezed by capillary action to the substrate in a controlled and prescribed amount, i.e. the wet ink deposit is proportional to the thickness of the mesh and or stencil. As the squeegee moves toward the rear of the screen, the tension of the mesh pulls the mesh up away from the substrate (called snap-off) leaving the ink along with the dispersed material or particles upon the substrate surface, thereby forming a fingerprint or signature.

In some embodiments, the printing element may be a thermal wax printer, otherwise known as a thermal transfer printer. A heat transfer press may be present in the thermal wax printer, which is a tool adapted to transfer a pattern from a carrier medium on a surface of an object, such as paper, with application of heat and pressure for a preset period of time. The heat transfer press can be a platen press or a rotary drum press. The carrier medium can be a substrate, such as paper. One or more sides of the carrier medium can comprise a pattern, which can be made up from an ink medium and an inherently disordered material or particles dispersed therein. During heat transfer printing, the heat transfer press can press the carrier medium to a surface of the object under heat and pressure, thereby transferring the pattern, together with the disordered material or particles to the object.

Besides the above-mentioned printing elements, a formation unit for a liquid composition comprising disordered material or particles can alternatively comprise a spin coating element adapted to form a layer of liquid composition on or in an object. In some embodiments, the spin coating element is a spin coater. An object, such as a silicon wafer can be loaded on a spin coater. A small puddle of a liquid composition, for example a liquid resin containing an identification feature based on inherent disorder, such as disordered material or particles, can be loaded onto the center of the object and then spun at high speed (typically around 3000 rpm). Centripetal acceleration can cause most of the resin to spread to, and eventually off, the edge of the object, leaving a thin film of resin and identification feature comprising the dispersed material or particles on the object surface.

In embodiments where the material or particles that are to be deposited in a disordered manner are dispersed in a liquid composition, the formation unit can further comprise a curing element, which is adapted to harden the polymer precursor thereby holding the dispersed material or particles in place in a polymer matrix. Any curing element that can harden the respective polymer precursor in the liquid composition can be used in the present invention. For example, the curing element may be a lamp that emits infrared, ultraviolet or visible light. As a further example, when the polymer precursor is epoxy, the curing element may be a heater that cures the epoxy polymer precursor using heat.

The apparatus for forming and reading an identification feature on or in an object according to the present invention can also have a formation unit that is adapted to form an identification feature based on an inherently disordered arrangement of bubbles. For example, the disordered bubbles can be formed in a bubble tag. The bubble tag can comprise a polymer precursor curable by means of infrared, ultraviolet, visible light or heat. As mentioned herein, suitable polymer precursors can comprise polystyrenes, epoxy resins, polyalkylenes, polyimides, polybenzoxazoles, polyacrylates, polyethers, polybenzoxayoles, polythioayoles, epoxides, (meth)acrylates, and polysiloxanes. The formation unit can further comprise a heating element or a gas delivery element adapted to generate bubbles in the polymer precursor, and a curing element adapted to harden the polymer precursor while bubbles are being generated. For example, the polymer precursor can be heated by the heating element such that bubbles are generated in the polymer precursor. In some embodiments, for example a bubble tag made from a lower melting point polymer, a gas delivery element can be used in place of a heating element to generate the bubbles. The curing element can cure or harden the polymer precursor while the bubbles are being generated such that the bubbles are present in the cured polymer. Suitable curing elements that can be used have already been discussed herein.

In some embodiments, more than one identification feature can be formed on or in the object. Accordingly, the formation unit of the apparatus can be formed from different combinations of a spin coating element, a printing element, a heating element, a gas delivery element and/or a curing element. For example, when the first identification feature is a barcode and the second identification feature is a bubble tag, the first formation unit of the apparatus can comprise a printing element for printing the barcode, and the second formation unit can comprise a heating element and a curing element for forming the bubbles. As another example, when the first identification feature is a logo that is printed with an ink comprising material or particles dispersed therein that are to be deposited in an disordered fashion, and the second identification feature is a bubble tag, the first formation unit of the apparatus can comprise a printing element for printing the logo and the second formation unit can comprise a gas delivery element for forming the bubbles in the tag. In this embodiment, a curing element can for example be shared between the first formation unit and the second formation unit to cure the polymer precursor in the liquid composition and the bubble tag respectively.

According to the present invention, the identification feature that is physically formed by the formation unit of the apparatus can be read by the at least one reading unit comprised in the apparatus for forming and reading an identification feature on or in an object so as to form a signature. In the following, embodiments of the at least one reading unit that can be used in the invention are described.

The at least one reading unit may be adapted for reading information from a plurality of disordered particles present as the identification feature. Thus, the reading unit can be adapted to detect a signal resulting from the characteristic arrangement of the disordered particles providing a unique signature.

For example, the plurality of disordered particles can comprise magnetic or magnetisable particles. The at least one reading unit can be a reading unit adapted to read information, for example, magnetic field from the plurality of disordered magnetic or magnetisable particles on or in an object, such as a magnetic stripe reader as described in International Patent Application WO 2006/078220. Alternatively, the reading unit may also contain one or more magneto-optical readings element. The magneto-optical reading element(s) may be a magneto-optical reading element as described in International Patent application WO 2009/105040 (see for more details, the description of the reading element shown in FIG. 3 to FIG. 7 of WO 2009/105040).

As another example, the plurality of disordered particles may comprise conductive and/or semiconductive particles. The at least one reading unit can be a reading unit adapted to read the electrical or electromagnetic information from the plurality of disordered conductive and/or semiconductive particles on or in an object, such as an electrical or electromagnetic or magnetic reader reading out an electrical parameter characteristic for an arrangement of disordered particles.

As a further example, the plurality of disordered particles may comprise optically active or optically distinguishable particles. The at least one reading unit can be an optical reader or detector, which may read out an optical parameter such as a reflectance or fluorescence intensity, an optical anisotropy, or the like. In some embodiments, the at least reading unit is an optical microscope which can read the optical imaging information from an identification feature. The reading unit can also be adapted to detect photons emitted from a plurality of disordered optically active particles on or in an object. The at least reading unit can also be adapted to detect photons reflected from or deflected by a plurality of disordered optically distinguishable particles included in an identification feature of the tag or the object.

In accordance with the above disclosure, a conventional reading unit can be used in order to determine a characteristic signature from the identification features formed on the object. Examples of a reading unit that can be used are a cassette tape player, a video cassette player (VCR), a compact disc (CD) player, a digital video disc (DVD) player, a magnetic data storage tape reader, a hard disk drive reader, a Zip™ disc reader, a Jazz™ disc reader and a magnetic stripe reader, for example. Alternatively, a magnetic force microscope, commonly known as an MFM, can be used. In addition, detection of magneto-optical effects such as the magnetic Kerr effect can be utilized. For determining characteristics such as the electric or electromagnetic field strength, any conventional high sensitivity electric field meter or electro magnetic field (EMF) gaussmeter which can be calibrated to a suitable frequency can be used for this purpose. For determining optical characteristics, any photodetector or photodiode may be used equipped where necessary with polarizing filters and/or colour filters for example. For determining roughness characteristics or topographic information of a surface, an atomic force microscope (AFM) or scanning electron microscope (SEM) can be used. Finally, as mentioned above, a magneto-optical reading element as described in WO 2009/105040 can also be used here. In addition, it is also possible to use a magneto-optical reading element as described in pending PCT application PCT/SG2010/000259 filed 8 Jul. 2010 claiming the benefit of priority of U.S. provisional patent application 61/224,128, filed with the United States Patent and Trademark Office on 9 Jul. 2009 in which a dichroic or dielectric mirror is used such that a simultaneous reading of both magnetic and optical information from the same position. The content of each of the PCT application PCT/SG2010/000259 and U.S. provisional patent application 61/224,128 is incorporated herein by reference for all purposes in its entirety.

In some embodiments, the object, which can be an item of value or a tag, may additionally have stored further information, for example, the price of the object, the manufacturer thereof or the like. Such information may be included in a conventional bar code, a two-dimensional bar code, a magnetic strip or a memory chip. The reading unit can thus also be adapted to read such a signature from a conventional barcode, a two dimensional barcode, a magnetic strip or memory chip.

It is also possible to use a reading unit having at least two different types of reading capabilities, for example, magnetically and optically, or electrically and magnetically. In so doing, the security can be further improved. Depending on the reading unit used, more than one property or characteristic can be determined concurrently. For example, using the AFM, both the surface roughness and topographic image of an identification feature can be obtained from a single reading of the object. In this context, it is important to note that a reading element that is used in the reading unit may comprise more than one sensor, for example one optical sensor and one magnetic sensor. Such a reading element having both an optical and a magnetic sensor, is for example, described in PCT application WO 2007/133163, where the reading of a first identification feature and a second identification feature is used to derive/form a signature that represents the relative spatial orientation of the two (sets of) identification features. As explained in WO 2007/133163, the first sensor may be a magnetic sensor, for example, to read a signal from a disordered array of magnetic particles and the second sensor may be an optical sensor, for example, able to read a barcode. Alternatively, both sensors might be optical sensors, with one sensor reading an disordered array of optically detectable or active particles and the second sensor being a barcode reading element, for example.

In a further embodiment, the apparatus for forming and reading an identification feature can have a data storage unit adapted to store a signature obtained from a reading of the identification feature on or in an object. Examples of a data storage unit include, but are not limited to, a magnetic strip, a memory chip, a media disk, a hard disk, a smart-card, a random access memory (RAM) module, a magnetic tape or conventional optical means such as a 2D barcode or bitmap.

The term 'signature' as defined herein, refers to measurements or readings carried out by (one or more reading elements of) the reading unit. The signature may be obtained from a reading of the identification feature on or in an object by the reading unit. The reading unit is also adapted to read the identification feature on or in the object to form a reference signature that is stored in the object or the data storage unit. Depending on the number of times that the identification feature is read, multiple readings can be taken by the reading unit to either form a plurality of signatures or to form a combined signature. The combined signature or each of the plurality of signatures can stored in the data storage unit or in the object to form a pre-stored reference signature.

The pre-stored reference signature, which can be stored in the object or the data storage unit, can be used for example in quality control or verification purposes, to compare with a signature from the identification feature read by the reading unit. For example, after an identification feature is formed on an object, the identification feature can be read by a reading unit to form a signature. This signature can be stored in the data storage unit to form a pre-stored reference signature. Subsequently, for authentication purposes, the object can be read by the reading unit to form a second signature, which can be used to compare with the pre-store reference signature. If the deviation between the signature and the pre-stored reference signature is less than a threshold value, the identification feature is considered to be verified. In turn, the object as such or the object to which the tag is attached may be considered authentic.

The apparatus for forming and reading an identification feature may have a processing unit adapted to process the signature from the identification feature read by the reading unit. In some embodiments, the processing unit is adapted to compare the signature of the fingerprint read by the reading unit with a pre-stored reference signature. In such a case, the processing unit is adapted to receive a pre-stored reference signature that is located in the data storage unit or in the object. In carrying out the comparison, the processing unit can be adapted to compare the signature from the identification feature read by the reading unit with the pre-stored reference signature, and identify an object to be valid, if the signature read from the object differs from the pre-stored reference signature by less than a predetermined threshold. For example, the identification feature based on inherent disorder can comprise a disordered arrangement of optically active particles, which can be located or formed on the surface of an object such as an identification tag. A first reading in the form of an optical image of the disordered arrangement of optically active particles can be taken by the reading unit to form a signature. This signature can be stored on a data storage unit and used as a reference signature. A second reading of the identification feature on the same object can be taken, for example at a later time period, and a processing unit can be used to compare against the reference signature, for example using the size and location of the particles, to confirm the identity of the object for validation purposes.

The processing unit may be further adapted to update the pre-stored reference signature by re-writing or appending the pre-stored reference signature using information from the most recently read fingerprint/signature. The processing unit can also be adapted to store the signature from the read fingerprint as an updated reference signature for a future verification check. When using an object such as an item of value or a tag containing the identification feature for a longer period, abrasion of the identification feature may occur as a consequence of the intense use of the identification feature for authentication purposes. Such an abrasion may cause the characteristic signature to be changed. In a static system, in which the pre-stored reference signature would always stay constant, such an abrasion effect may have the consequence that an identification tag is not recognized by the system. Thus, the dynamic system that is used in one embodiment of the invention updates changes in the detected signature and stores this updated signature as the pre-stored reference signature. Thus, small changes with time due to abrasion of material of the identification feature can be taken into account, thus improving the functionality of the system, since an erroneous classification of a tag or the object to be non-valid as a consequence of abrasion is avoided.

Each reading unit of the apparatus according to the invention can comprise at least two reading elements. The term "reading element" refers to the part of the reading unit that actually reads the identification feature. For example, the reading element of a cassette tape player and a compact disc player are commonly known as a read head. As another example, the reading element of a magnetic stripe reader is also known as a magnetic head. Another example is a magneto-optical reading element as described in WO 2009/10540. Such a read head or the magneto-optical substrate in a magnetic-optical reading element are also referred herein as sensors. As mentioned above, it is also possible that a reading element may not only comprise one type of sensor, for example, a reading element of a cassette/tape player or a magnetic head but two different types of sensors, for example, a magnetic head for reading a magnetic identification feature and an optical sensor for reading optically detectable identification features such as a 1D or 2D barcode. In some embodiments, the first reading element of the reading unit is adapted to read the identification feature on or in an object to obtain a first reading of the signature, and the at least second reading element is adapted to read the identification feature to obtain a second reading of the signature.

Each reading unit of the apparatus according to the invention may also comprise a plurality of reading elements (i.e. more than two reading elements), for example three, four or five reading elements. Each reading element can read the identification feature on or in an object to form a plurality of signatures. The processing unit in the apparatus can be adapted to derive an averaged signature from the readings of the plurality of reading elements. Also each of these reading elements may have more than one sensor.

The term "averaged signature" or "average signature" generally refers to a signature that has been generated, by any suitable mathematical operation, from the readings of the plurality of reading elements. Accordingly, it does not necessarily mean that the signal is a mathematical average of the readings. For example, when the signature is a numerical value, such as roughness values, the averaged signature derived from the readings of the plurality of reading elements may be an arithmetic average of the values. In some embodiments, the averaged signature can be a weighted average of the values or the median, or it could be some other representation of the readings e.g. a composite signature with the highest peaks from the readings. As another example, when the signature is a magnetic field strength spectrum, the averaged signature derived from the readings of the plurality of reading elements can be in the form of an averaged spectrum. For example, the identification feature can be a disordered arrangement of magnetic particles. Magnetic field readings can be taken along one or more reading paths of the reading unit to derive one or more magnetic signal spectra. The processing unit can then be used to compare the signature i.e. the magnetic signal chart in terms of values, such as number and location of peaks, and peak height, with a pre-stored reference signature for validation purposes. The use of a plurality of reading elements to obtain multiple readings, which is in turn used to form an averaged signature is beneficial, since the reading elements can be subjected to normal wear and tear through use. As a result, the readings from a reading element can slowly deviate from its actual value with each use. This is especially important in embodiments wherein the identification features are based on inherent disorder, since the identification information comprised in the identification feature is not known prior to formation of the feature. In case only one reading element is used, a faulty reading element may not be detected easily since there may not be a basis for verifying the readings obtained.

The term "averaged signature" also includes taking a representative signature from the plurality of readings. For example, the averaged signature can be the median value of the plurality of readings. As another example, the averaged signature can be the mode value of the plurality of readings. In some embodiments, a reading by one of the reading elements may be distorted, for example, by dirt that is present on the object surface. This could result in an erroneous reading that is very different from the readings obtained from the other reading elements. In this embodiment, an averaged signature could be in the form of a representative signature derived from the multiple readings that excludes the erroneous reading.

Another advantage of using at least two or a plurality of reading elements (that means more than two reading elements) is that the reading elements can be knowingly "offset" or different from each other. For example, if the reading devices used in the field have a known tolerance range, e.g. the reading devices can behave slightly differently, then multiple reading elements can be used in an apparatus according to the invention to cover the threshold range and to take enough different readings for storage on the data server to ensure that a reading from most any reading device can be accurately matched. In some embodiments the reading elements may be "offset" in that they physically read a slightly different portion of the fingerprint material. The same concept can work for any system where the readings are different due to a variety of factors. These factors can be due, for example, to inherent differences in performance between different reading devices, or due to angular misalignment of readers, or other such uncertainty causing imperfect matching between readings with different reading devices. An example which may cause variation in readings is variation in the performance of components used in the reading devices, e.g. variations in the sensors that are used. Such sensor variations may be inherent in the manufacturing of the sensors or may arise because sensors from different suppliers are used. In a more extreme example, the readers being used to read the fingerprint material may themselves be readers from different manufacturers which perform differently from each other. In some embodiments, rather than storing multiple readings in the data server, it may be possible to store only one reading, along with data on allowable and/or observed variation in selected aspects of the reading.

In this context, the invention also refers to a method of reading and verifying a tag based on inherent disorder during a formation (manufacturing) process, wherein this method comprises:
using a first reading element to take a first reading of an inherent disorder feature of the tag;
using at least a second reading element to take at least a second reading of the inherent disorder feature of the tag;
matching the first reading with at least the second reading;
determining one or more acceptance criteria, wherein at least one of the acceptance criteria is based on whether the first reading and the second reading match within a predetermined threshold;
accepting the tag if the acceptance criteria are met; and
recording a signature for the tag if the tag was accepted.

Note that herein "accepted" means that the tag is accepted for use, i.e. for distribution and use in the field for identification, i.e. it is the opposite of rejected where the tag is deemed unsuitable for us and is therefore destroyed, quarantined, or reprocessed.

The at least two reading elements can either be arranged within the same reading units and/or in two different reading units as described herein. For example, the first reading and the second reading may be carried out in the same (a single) reading unit if an apparatus of the invention comprises only one reading unit. Alternatively, if an apparatus for forming and reading an identification feature that comprises two reading units, the first reading may be taken by a reading element that is arranged in the first reading unit and the second reading may be taken by a second reading element that is arranged in the second reading unit. Alternatively, if an apparatus as described herein has two reading units and both reading units have at least two reading elements, then the first and the second reading can be taken by either of the at least two reading elements. It is of course also possible that the first reading is taken both by a first reading element of the first reading unit and the second reading is taken by a second reading element of the first reading unit and the second reading unit.

The processing unit comprised in the apparatus according to the present invention can also be adapted to compare the first reading of the signature from the identification feature read by at least one of the plurality of reading elements with the second reading of the signature from the identification feature read by at least one of the plurality of reading elements, and determine whether the first reading of the signature differs from the second reading of the signature by less than a predetermined threshold. As an example, the identification feature formed may not be stable due to problems during the formation process. For instance, the setting of the curing element may be set wrongly for a particular polymer precursor such that the material is insufficiently cured. As a result, the disordered material may not be sufficiently set on the object, which could result in a different reading of the identification feature. Therefore, by comparing between the first reading and second reading of the identification feature, and determining whether an acceptance criteria is met, such defects in the identification feature can be detected. However more usually the first and second readings may be different (i.e. not match or correlate with each other to within a predefined threshold) due to a poor reading by one of the reading elements. This "poor" reading may occur due to various factors, e.g. dirt on the object as it was read, or simply that the particular fingerprint material does not allow sufficiently good correlation when read by two "offset" reading elements. In general acceptance or rejection of the fingerprint is determined by some criterion or criteria based on an individual reading, e.g. that the disordered material provides a sufficiently "rich" fingerprint, and in addition acceptance or rejection is also based on a matching criterion or criteria between different readings of the same disordered material, e.g. that the fingerprints from different readings match each other better than some predefined threshold. In this case sufficiently "rich" means that the fingerprint contains sufficient information of sufficient strength such that it can be identified with sufficient confidence. For example in the co-owned International Patent Applications WO 2007/133163 and WO 2007/133164 a sufficiently "rich" fingerprint could be defined as a fingerprint with more than eight peaks above a certain threshold strength.

The apparatus according to the present invention can also comprise a second reading unit adapted to read a second identification feature to form at least a second signature. For example, the first identification feature can be a barcode and the second identification feature can be a disordered arrangement of conductive or magnetic particles. Accordingly, the first reading unit can be a barcode reader for reading the barcode, and the second reading unit can be an electric field reader for reading a fingerprint of the disordered conductive particles, or a magnetic or magneto-optical read head for reading a finger print of the disordered arrangement of the magnetic particles, for example. It is important to note that this second identification feature may not be formed by the apparatus of the invention but can already be present on or in the object when the at least one identification is formed by the apparatus of the invention. For example, a barcode or hologram may already be present on the object to be identified, when a disordered arrangement of magnetic particles is formed on the object by the formation unit of the apparatus described herein.

In some embodiments, the first identification feature can act as a positional reference for the second reading unit to read the second identification feature. For example, a barcode forming the first identification feature and a disordered arrangement of fibers can be formed on the surface of an object. Due to the irregularity of the fibers arrangement, it can be difficult to define a consistent starting point for the reading unit to read the second identification feature. The position of the barcode on the object can act as a positional reference point that is consistent across multiple readings of the same sample and/or different samples for the second reading unit to read the disordered fibers arrangement.

The processing unit comprised in the apparatus according to the present invention can be adapted to derive a combined signature from the first signature and the second signature. For example, the combined signature can be derived using the relative spatial relationship between the first signature and the second signature.

The apparatus for forming and reading an identification feature formed on or in an object can comprise at least a second formation unit for forming a second identification feature on or in an object. The second identification feature can be an identification feature based on inherent disorder, an identification feature based on radio frequency, and an optically readable pattern such as a logo, a graphic, a barcode or a hologram. The type of formation unit is dependent on the type of identification feature to be formed on or in an object. For example, for an identification feature that is based on radio frequency, the formation unit can be a radio frequency encoder. A formation unit that can be used to form an identification feature based on inherent order has already been described herein.

The apparatus for forming and reading an identification feature can further comprise a communication unit that is adapted to transfer data with a remote external device. The communication unit is adapted to transfer data a mode, such as a local area network (LAN), a wireless local area network (WLAN), a wide area network (WAN), a wireless wide area network (WWAN), a virtual private network (VPN), cellular network, a wireless network, a wired network, the internet, an intranet, a satellite communication network, Bluetooth™, infrared and a combination thereof. Accordingly, the communication unit can be a modem for connecting to the internet, or a mobile communication unit such as a cellular phone. In embodiments in which the data storage unit is located remotely, the reading unit is adapted to send the read signal via the communication unit to the data storage unit or external device (such as a server computer), where the database of pre-stored reference signatures is housed, and the remotely located data storage unit or external device is able to compare the read signature with the relevant pre-stored reference signature(s). Upon matching the read signature with a pre-stored reference signature, the remotely located data storage unit can send a message back to the processing unit to verify the item and provide the user with any other pertinent information store on the database. If no match is found, the remotely located data storage unit or external device can return a signal stating that no match was found and other information (such as suggestions on what steps the user should take in these circumstances).

In a further embodiment, the apparatus for forming and reading an identification feature comprises a rejection unit which is able to remove, mark, disable or destroy rejected (that means not accepted, see above) tags. An example of a unit able to destroy a rejected tag is a shredding unit adapted to destroy tags or objects that are rejected. This can allow the user or operator to destroy defect items or tags before they are released. Note that although the term "tag" is used herein, it is contemplated that this invention is also applicable to other situations, e.g. where the disordered material is attached or embedded directly to an object of value to be authenticated or to an ID card for example. Therefore, the term "tag" is used herein to include any object or item of value to which the disordered material is or may be attached or into which such disordered material may be embedded.

In a further embodiment, the apparatus for forming and reading an identification feature comprises a data logging unit adapted to record operating data. The data logging unit can be used for process troubleshooting purposes. For example, in an industrial setting, an operator or user using the apparatus can log in using a user ID and password which can be logged by the data logging unit. Other parameters such as operating conditions, acceptance and rejection criteria, and tag numbers printed, for example, can be logged by the data logging unit. This data can be stored in a data storage unit located in the apparatus or it can be stored in a data storage unit located remotely to the apparatus, wherein data is transferred via a communication unit of the apparatus. In some embodiments, the data logging unit can be password protected so that operator do not have unauthorized access to the data to prevent tampering of the data.

In a further embodiment, the apparatus for forming and reading an identification feature comprises a mode selector, wherein the apparatus is adapted to print and read the object in a first mode, and to read the object only in a second mode. For example, under normal operating mode, the apparatus is adapted to print and read the object. However, in some cases, it may be desirable to check a batch of tags post production i.e. the tags have already identification features formed thereon. In such an instance, the tags can be fed through the apparatus in a read mode such that only the reading unit is utilized to read the tags.

The apparatus for forming and reading an identification feature according to the present invention can be fabricated as a small desktop version or as a larger industrial version. The apparatus can further comprise a housing, wherein the formation unit and the at least one reading unit can be contained within the housing. The housing can protect the formation unit and the at least one reading unit contained within. In addition, the housing can confer portability to the apparatus, i.e. it can be carried or transported easily, for example, from a retail outlet to the end user. It is envisioned that for different embodiments, for example different models of the apparatus, combinations of additional units such as the data storage unit, the processing unit, the data logging unit and/or the communication unit can also be comprised within the housing.

Depending on the combination of units in the housing, a transport unit can be present to transfer the object or tag to the various units in the apparatus. For example, a transporting unit adapted to transfer the object from the formation unit where the identification feature is physically formed, to the at least one reading unit for reading the identification feature can additionally be comprised in the apparatus. Any transporting unit that is operative to transfer an object from the various units in the apparatus can be used. For example, the transporting unit can be a conveyor belt or robotic arms. In some embodiments, an object, such as an identification tag, can be transported or carried away from the formation unit wherein an identification feature is physically formed via a conveyor belt, to the reading unit, wherein the identification feature is read. In some embodiments, such as for items having a greater tendency to roll off a conveyor belt, robotic arms might be used as the transporting unit. A loading unit and an unloading unit adapted to load and unload the object from the apparatus can also be present.

The apparatus for forming and reading an identification feature formed on or in an object can be used for any object, which can be an item of value or an identification tag. For example, an item of value can be a luxury item, an engineering component, a textile, the packaging around an object, a seal to a container or vessel, a credit card, a certificate, a bank note, a security access card, a vehicular key-card, a passport, an identity card, a lead frame, an electronic device package, or a media disk. In the case of an identification tag, the identification tag can be adapted such that it is attachable to an object to be identified. For this purpose, at least one surface of the tag is least partly adhesive or at least partly suitable to be subjected to thermal bonding.

In another aspect, the present invention refers to an apparatus for forming and reading an identification feature on or in an object. The apparatus comprises a formation unit for forming an identification feature on or in an object, such as a RFID tag, wherein the identification feature is read using radio frequency. The formation unit can comprise an antenna for receiving and transmitting the signal for activating the tag, as well as to read and write data to it. In some embodiments, the formation unit is a RFID encoder.

This apparatus which uses radio frequency for reading the identification feature also comprises at least one reading unit adapted to read the radio frequency to form a signature. The reading unit can transmit or receive in ranges between, for example, a couple of centimeters to meters or even more, depending upon the power output and radio frequency used by the reading unit. This embodiment of the apparatus described herein further comprises a housing for containing both the formation unit and the at least one reading unit.

Such an apparatus can further comprise a processing unit which can decode the data encoded in the tag's integrated circuit (silicon chip) and the data is passed to the processing unit for processing. This data can provide identification or location information, or specifics about the product tagged, such as price, color, and date of purchase.

In a further aspect, the present invention refers to a method of forming and reading an identification feature on or in an object. The method comprises providing an apparatus having a formation unit for physically forming an identification feature on or in the object, and at least one reading unit, wherein the at least one reading unit is adapted to read the identification feature on or in the object to form a signature, wherein both the formation unit and the at least one reading unit are contained in a housing. The identification feature can comprise an identification feature based on inherent disorder. The identification feature being read can comprise a physical property independently selected from reflectivity, magnetic field strength, luminescence, radio frequency, and electric field strength.

By determining at least one characteristic such as magnitude of a property of one or more identification features, a signature representing the set of identification information can be obtained. For example, the signature that can be obtained from determining the reflective properties across a surface of the barcode when a beam of light passes over the barcode can be the reflectivity signal. In the example of an identification feature comprising dispersed magnetic particles, the signature that can be measured by a magnetic reading element can be the magnetic field strength. In case, electrically conducting identification features are employed, the electrical field strength can be measured. If optically active particles are dispersed in an identification layer, then fluorescence or luminescence intensity can be measured. Alternatively, if an RFID tag is used, then the radio frequency signal produced by the tag can be measured. Other possible characteristics can be measured from other types of identification information.

The method can further comprise storing the signature using a data storage unit, thereby generating at least one pre-stored reference signature. The data storage unit can be located in the apparatus or at a remote location which can be accessed remotely. The method can further comprise remotely accessing the data storage unit using a communication unit that is adapted to remotely transfer data with an external device. Examples of a communication unit that can be used in the present invention have already been described herein.

In some embodiments, the method further comprises verifying the identity of the object. The identity of the object can be verified by checking a read signature against the at least one pre-stored reference signature. In this embodiment, the identity of the object is verified if the values of data for the read signature differ from the corresponding values pre-stored reference signature by less than a predetermined threshold.

Alternatively, the read signature of the object can be cross checked against values for the signature that is either stored or known. For example, the at least one reading unit can comprise at least two reading elements, wherein a first reading element reads the identification feature to form a first signature and a second reading element reads the identification feature to form a second signature. Comparison can be made between the first signature and the second signature and the object is identified to be valid or accepted/passed, if the fingerprint and/or signature read from the object by the first reading element differs from that read by the second reading element by less than a predetermined threshold.

The method according to the present invention can comprise providing at least a second formation unit for forming at least a second identification feature on or in an object. The first identification feature and the second identification feature can be formed at the same time i.e. concurrently on or in an object by the first formation unit and the second formation unit. The first formation unit and the second formation unit can also form that first identification feature and the second identification feature in a sequential manner.

The method of the present invention can further comprise providing at least a second reading unit adapted to read the at least second identification feature to form at least a second signature. The first signature and the at least second signature can be processed by the processing unit in the apparatus to derive a combined signature.

The present invention also refers to a method of forming and reading an identification feature on or in an object. The method comprises providing an apparatus having a formation unit for physically forming an identification feature on or in the object, and at least one reading unit, wherein the at least one reading unit is adapted to read the identification feature on or in the object to form a signature, wherein the at least one reading unit comprises at least two reading elements.

The invention will be further illustrated with reference to the drawings in the following exemplary embodiments.

Exemplary Embodiments

FIG. 1 depicts a schematic diagram of an illustrative embodiment of an apparatus 100 for forming and reading an identification feature according to the present invention. The apparatus 100 for forming and reading an identification feature on or in an object comprises a formation unit 101 for physically forming an identification feature on or in an object, and at least one reading unit 102 adapted to read the identification feature to form a signature. The object can be placed into the formation unit 101 via an inlet 150 of the formation unit. Upon physically forming the identification feature on or in the object, the object is transferred to the reading unit 102 by a transporting element such as a conveyor belt from an outlet 151 of the formation unit 101. The identification feature on or in the object is read by the reading unit 102 to form a signature. The object can be released from the reading unit 102 via an outlet 152 of the reading unit 102.

Figure 2:
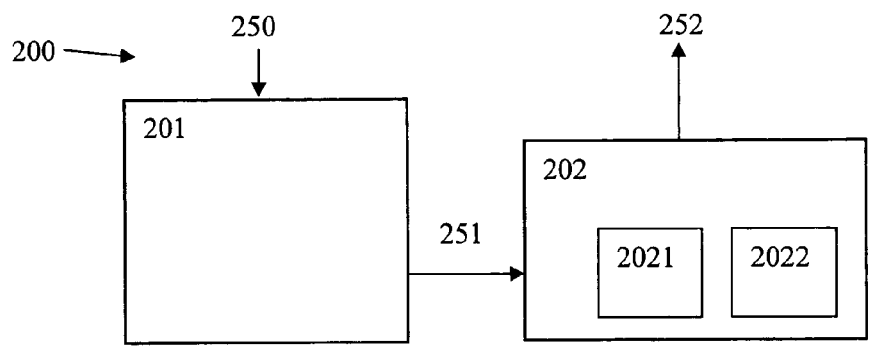
FIG. 2 shows a schematic diagram of an illustrative embodiment of an apparatus 200 for forming and reading an identification feature according to the present invention.

FIG. 2 shows a schematic diagram of an illustrative embodiment of an apparatus 200 for forming and reading an identification feature according to the present invention. The apparatus 200 comprises a formation unit 201 with an inlet 250 and an outlet 251, a transporting element and a reading unit 202 with an outlet 252. In this embodiment, the reading unit 202 comprises at least two reading elements 2021 and 2022. The identification feature on or in the object that will be used for authentication of the object is read by the first reading element 2021 to take a first reading of the identification feature, followed by the second reading of the identification feature by the second reading element 2022. The two readings of the identification feature can, for example, be used to either form an averaged signature or some other mathematically manipulated signature that represents a typical signature. Alternately, both signatures can be stored in the database as two reference signatures and for verification matching can be done against one or both of the signatures or matching could be against some composite signature derived from the two or more stored signatures. In addition, the signatures from the two readings can be compared with each other and must match above a certain threshold in order for the tag to be accepted, if the signatures do not match sufficiently then the tag may be rejected or may be earmarked for re-reading.

Figure 3:
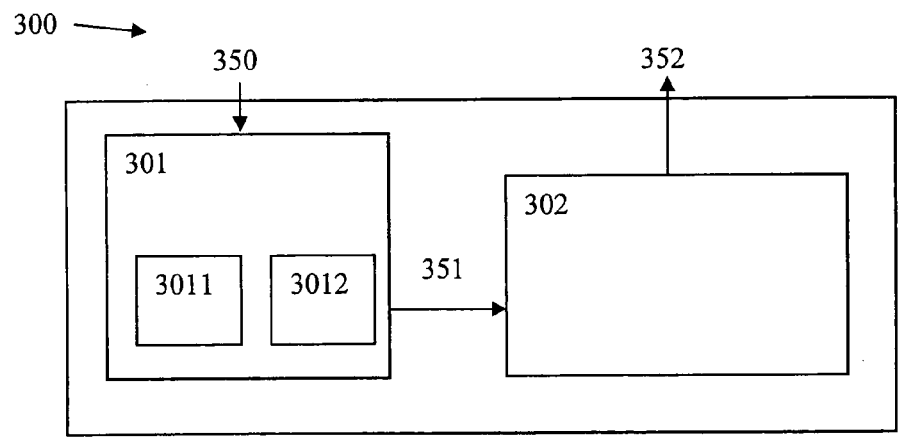
FIG. 3 shows a schematic diagram of an illustrative embodiment of an apparatus 300 for forming and reading an identification feature according to the present invention.

FIG. 3 shows a schematic diagram of an illustrative embodiment of an apparatus 300 for forming and reading an identification feature according to the present invention. The apparatus 300 comprises a formation unit 301 and a reading unit 302. Depending on the identification feature to be formed, the formation unit 301 can comprise different elements 3011 and 3012. For example, in case the identification feature based on inherent disorder comprises disordered bubbles, 3011 can be a heating element and 3012 can be a curing element. For example, in case the identification feature based on inherent disorder comprises disordered nanoparticles dispersed in a solid composition, 3011 can be an adhesive application element and 3012 can be a spraying element. Alternately the formation unit 3011 can form a first set of identification features, e.g. a barcode, and formation unit 3012 may form a second set of identification features based on inherent disorder. If the barcode formation process is sufficiently stable and high quality it may be unnecessary to read the first set of identification features (e.g. the barcode) again. In this case the reading unit may only read the second set of identification features based on inherent disorder.

Figure 4:
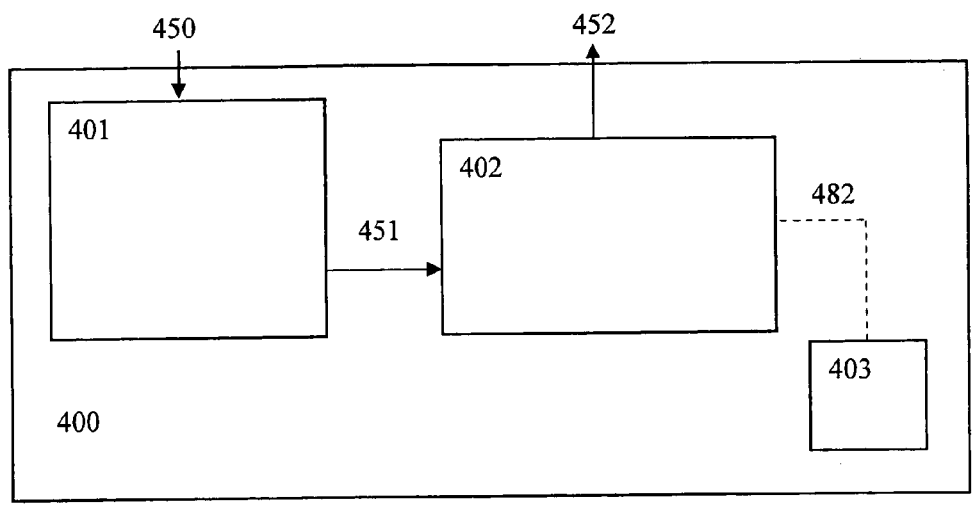
FIG. 4 shows a schematic diagram of an illustrative embodiment of an apparatus 400 for forming and reading an identification feature according to the present invention.

FIG. 4 is a schematic diagram of an embodiment of an apparatus 400 for forming and reading an identification feature according to the present invention. The apparatus 400 comprises a formation unit 401 and a reading unit 402. The apparatus further comprises a data storage unit 403, which is adapted to store the signature 482 from the identification feature read by the reading unit 402.

Figure 5:
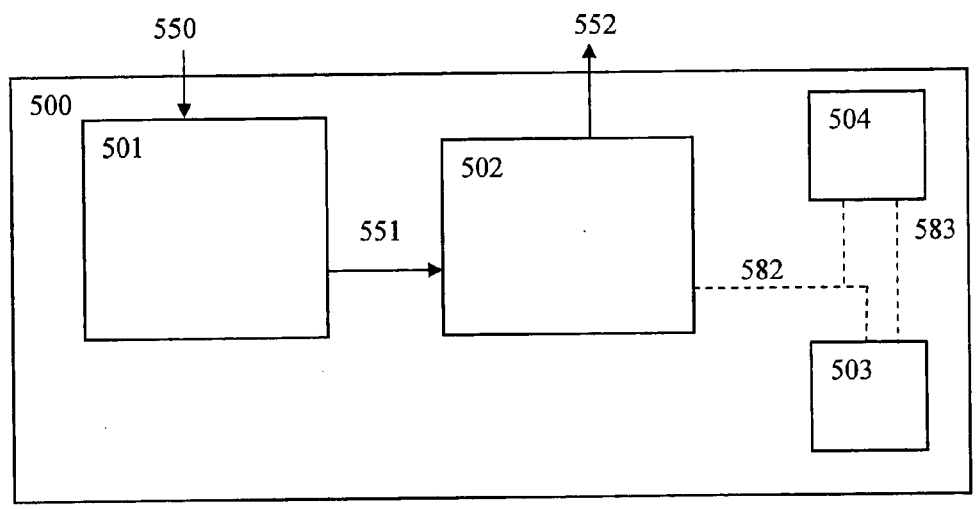
FIG. 5 shows a schematic diagram of an illustrative embodiment of an apparatus 500 for forming and reading an identification feature according to the present invention.

FIG. 5 is a schematic diagram of an embodiment of an apparatus 500 for forming and reading an identification feature according to the present invention. The apparatus 500 comprises a formation unit 501, a reading unit 502 and a data storage unit 503. The data storage unit 503 is adapted to store the signature 582 from the identification feature read by the reading unit 502. The apparatus 500 further comprises a processing unit 504 adapted to process the signature 582 from the identification feature read by the reading unit 502.

Figure 6:
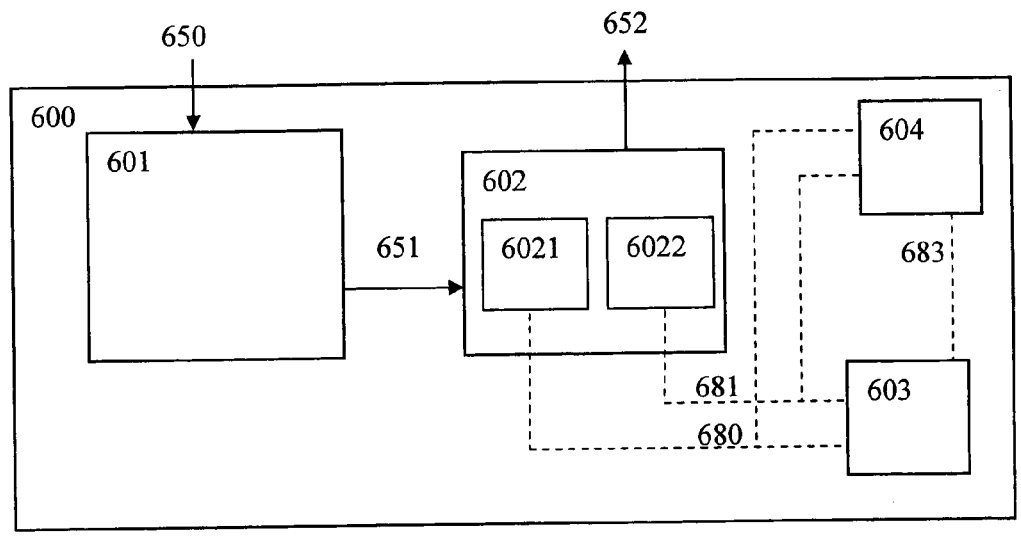
FIG. 6 shows a schematic diagram of an illustrative embodiment of an apparatus 600 for forming and reading an identification feature according to the present invention.

FIG. 6 is a schematic diagram of an embodiment of an apparatus 600 for forming and reading an identification feature according to the present invention. The apparatus 600 comprises a formation unit 601, a reading unit 602 and a data storage unit 603. The reading unit 602 comprises at least two reading elements 6021 and 6022. The first reading element 6021 is adapted to read the identification feature on or in an object to form a first reading 680 of the signature and the at least second reading element 6022 is adapted to read the identification feature to form a second reading 681 of the signature. The data storage unit 603 is adapted to store the first reading 681 and the second reading 682 of the signature from the identification feature read by the reading elements 6021 and 6022 of the reading unit 602. The apparatus 600 further comprises a processing unit 604 which is adapted to process the first reading 681 and the second reading 682 of the signature. The processing unit 604 can also be adapted to generate an averaged signature 683 and to send that averaged signature for storage in either the data storage unit 603 or to a remote data storage unit. The processing unit 604 could also be adapted to receive data from external sources, e.g. other pieces of equipment or computers. Such information may be previously read signatures from the same tag, or it could be information such as which tags have already been found to be, for example, visually unsatisfactory, i.e. such tags need to be rejected, marked or reprocessed or in some way treated differently from completely accepted tags. The processing unit 604 could ensure that such tags are rejected or marked either by a reject station in the equipment (not shown) or by ensuring that such the tags rejected in another part of the process. Alternately it could ensure that such tags are fed through a different path such that they are reprocessed or destroyed.

Figure 7:
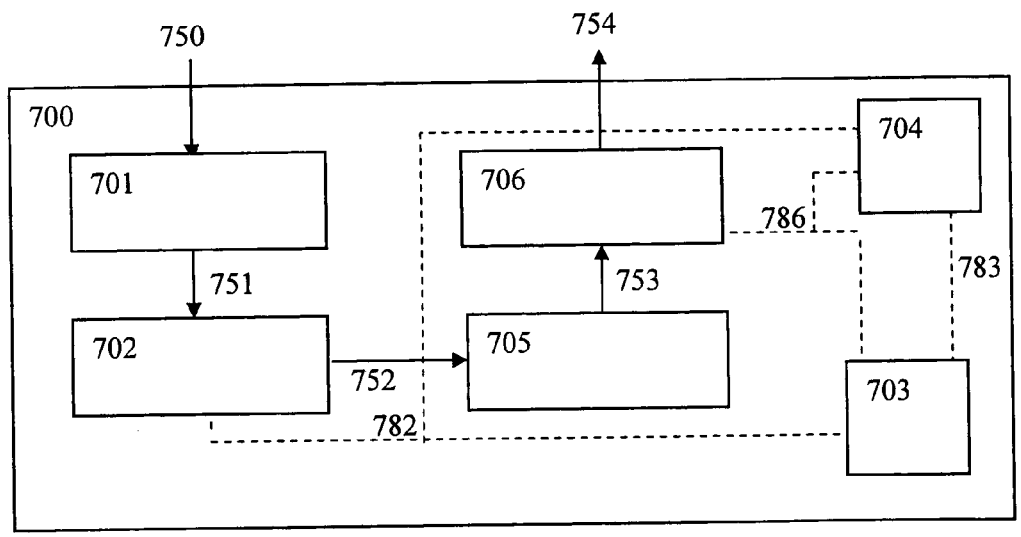
FIG. 7 shows a schematic diagram of an illustrative embodiment of an apparatus 700 for forming and reading an identification feature according to the present invention.

FIG. 7 is a schematic diagram of an embodiment of an apparatus 700 for forming and reading an identification feature according to the present invention. The apparatus 700 comprises a first formation unit 701 and a second formation unit 705, a first reading unit 702 and a second reading unit 706, a data storage unit 703 and a processing unit 704. The first formation unit 701 forms a first identification feature that is read by the first reading unit 702 to form a first signature 782. The second formation unit 705 forms a second identification feature that is read by the second reading unit 706 to form a second signature 786. The data storage unit 703 is adapted to store the first signature 782 and the second signature 786. The processing unit 704 is adapted to process the first signature 782 and the second signature 786 to form a combined signature. The processing unit 704 can also be adapted to receive a pre-stored reference signature 783 that is located in the data storage unit 703.

In certain circumstances it is advantageous to be able to store a signature (or signatures) based on a reading (or readings) of a one set of identification features into a second set of features also located on the tag or object of value. For example, if a first set of identification features based on inherent disorder is read, a signature derived from that reading can be stored in a second set of features (e.g. an RFID or smart chip or barcode such as a datamatrix code). Such a stored signature would, in general be compressed and encrypted prior to being stored. The compression may take the form of storing just a partial representation of the disordered material, for example looking at FIG. 42C from WO2009/105040, compression may take the form of just storing the position/size and or shapes of some of the particles, e.g. the strongest or largest particles or just those from the top right quadrant of the tag. Alternately, or in addition, the compression may be achieved by compressing the stored information using "lossy" compression (see: en.wikipedia.org/wiki/Lossy_compression). In such cases the amount of information stored in the tag or object may be very small indeed compared with the full or slightly compressed representation of the signature. In certain circumstances it may be beneficial to store a highly compressed, and encrypted, form of the signature on/in the tag or object and to store a more complete representation of the signature in a remote database. An example where this may be beneficial is if banknotes are made with two sets of identification features, one of which is based on inherent disorder and the other stores a compressed/encrypted version of the inherent disorder feature signature. If this type of bank note is used and a requirement is to have high speed authentication machines in various banks around a country it may not be feasible to always send the full/slightly compressed version of each note across the internet to a remote database for authentication. In this case, an authentication scheme can be implemented whereby localized matching can be done by the reading device in the bank whereby the disordered feature's signature is read and compared with the compressed version in the second set of features. The authentication scheme may for example be: if the localized match with the compressed data is very good, e.g. 99%, then the banknote is automatically accepted. If, instead, its matching is poor, e.g. below 90% then it is automatically rejected. If however the localized matching is in between the two thresholds (i.e. 90%<match<99%) then there is sufficient doubt as to whether the note is genuine or not. In this case the full (or slightly compressed) fingerprint can be sent to the remote data processor and database for more extensive matching against the remotely stored, but more complete, signature(s). By implementing such a matching scheme where the locally stored signature is used in conjunction with a remotely stored signature, significant benefits in speed and accuracy are possible. To achieve such a system it is beneficial to use an apparatus such as the one shown in FIG. 7 where the first set of identification features is formed and read prior to the formation of the second set of features. In this way the processing unit 704 can analyze the signature (or signatures if it is read multiple times, as would be advantageous in this instance) and form an "averaged signature". Such averaged signature can be highly compressed and encrypted and then can be integrated into the information being formed as the second set of identification features by formation unit 705. For example, if a datamatrix code is being formed as the second set of features and that set contains a serial number (e.g. 1234567890123456) that would normally only require a small datamatrix code to be printed (i.e. if it is an ECC200 datamatrix it would only need 14×14 elements to store such a number). But the datamatrix could be made significantly larger in order to also store the compressed/encrypted signature (a large ECC datamatrix with 144×144 elements can store roughly 1.5 kB of data). The processing unit 704 can also send a less heavily compressed version of the averaged signature(s) to various databases such as the one in data storage unit 703 or in some remote databases.

Thus, the apparatus shown in FIG. 7 and in principle any other apparatus that has at least two formation units for physically forming an identification feature on or in an object, is able to carry out a method of identifying an object using a partial fingerprint.

Accordingly, the present invention also refers to a method of verifying/identifying an object, wherein this method comprises:

obtaining a signature/fingerprint from at least one reading of an identification feature arranged on/or in an object, and
storing the signature derived from said reading in a second identification feature.

The method may further comprise compressing the signature prior to storing the signature in the second identification feature, wherein the compression preferably may comprise storing only a partial signature/fingerprint.

In some embodiments of this method, the first identification feature may be a feature that is based on inherent disorder, for example a disordered arrangement of magnetic or optically conducting particles. The second identification feature might be an RFID or smart chip or barcode such as a datamatrix code).

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

What is claimed is:

1. A method comprising:
forming an identification feature on or in an object, and
reading the identification feature on or in the object, with at least one reading unit, to form a first signature,
reading the identification feature on or in the object to form a second signature;
deriving a combined signature from the first signature and the second signature;
wherein the combined signature comprises a composite signature derived from at least a portion of information contained in both the first signature and the second signature.

2. The method of claim 1, wherein the at least one reading unit comprises at least two reading elements.

3. The method of claim 1, wherein the identification feature comprises an identification feature based on inherent disorder.

4. The method of claims 1, wherein the method further comprises storing the combined signature and generating at least one pre-stored reference signature.

5. The method of claims 4, further comprising verifying an identity of the object.

6. The method of claim 5, wherein verifying the identity of the object comprises comparing the combined signature with the one pre-stored reference signature.

7. The method of claim 6, wherein the identity of the object is verified if the signature read from the object differs from the pre-stored reference signature by less than a predetermined threshold.

8. The method of claim 5, wherein a first reading of the identification feature is read by a first reading element and a second reading of the identification feature is read by a second reading element.

9. The method of claim 8, wherein the identity of the object is verified if the first reading differs from the second reading by less than a predetermined threshold.

10. The method of claims 1, wherein the pre-stored reference signature is stored in a data storage unit that is accessible remotely.

11. The method of claim 10, further comprising remotely accessing the data storage unit using a communication unit adapted to remotely transfer data with an external device.

12. The method of claims 1, wherein the identification feature is an RFID or smart chip or a barcode.

13. The method of claim of claim 1, further comprising comparing the combined signature with at least one pre-stored reference signature.

14. The method of claim 1, further comprising comparing the first signature with the second signature.

15. A method comprising:
deriving a combined signature from a reading of a first identification feature and a reading of a second identification feature on or in an object, wherein the combined signature comprises a composite signature derived from at least a portion of information contained in both the reading of the first identification feature and the reading of the second identification feature;
storing the combined signature, and
verifying or identifying the object based on the combined signature.

16. The method of claim 15, further comprising compressing the combined signature prior to storing the combined signature.

17. The method of claim 16, wherein the compressing thee combined signature comprises storing only a partial signature/fingerprint.

18. The method of claim 15, wherein the first identification feature is a feature that is based on inherent disorder.

19. The method of claim 15, wherein the second identification feature is an RFID or smart chip or a barcode.

20. The method of claim 15, further comprising comparing the reading of the first feature and the reading of the second identification feature.

* * * * *